Sept. 5, 1961 W. YOGUS ET AL 2,998,737
ADJUSTABLE DIAMETER CUTTER FOR BORING
OPERATIONS AND THE LIKE
Filed Oct. 19, 1959 2 Sheets-Sheet 2

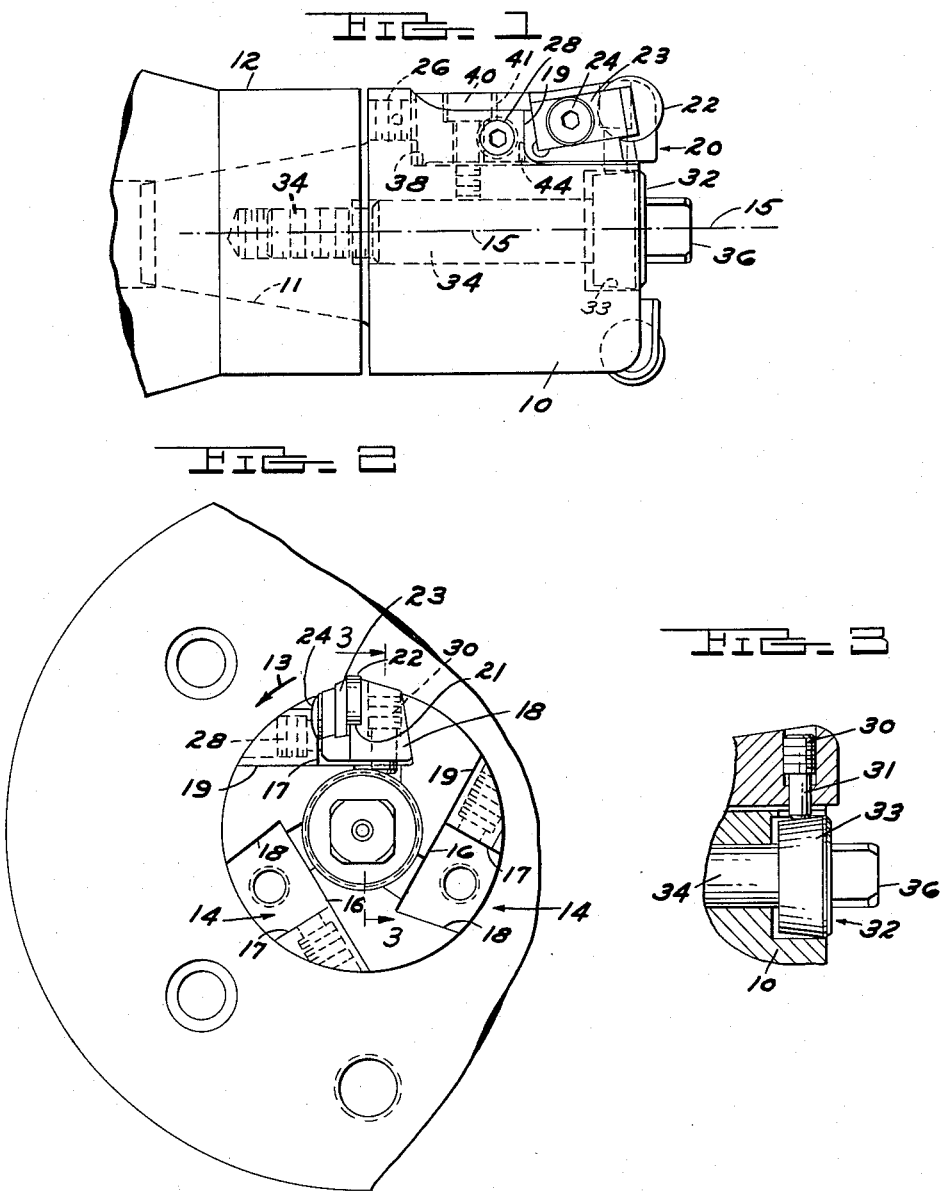

INVENTORS
WILLIAM YOGUS
JOHN DONALD MAC PETRIE
BY
Farley Forster & Farley
ATTORNEYS

United States Patent Office 2,998,737
Patented Sept. 5, 1961

2,998,737
ADJUSTABLE DIAMETER CUTTER FOR BORING OPERATIONS AND THE LIKE
William Yogus, Birmingham, and John Donald MacPetrie, Huntington Woods, Mich., assignors to The Valeron Corporation, Detroit, Mich., a corporation of Michigan
Filed Oct. 19, 1959, Ser. No. 847,139
16 Claims. (Cl. 77—76)

This invention relates to an improved construction for a cutting tool of the above type where the cutting diameter of the tool may be adjusted. The invention also applies to that class of tools where the cutting element or blades is carried by a cartridge which is mounted in the tool holder; and in its preferred form, the invention further relates to a tool where the cutting element is of the removable or "throwaway" type.

The construction of the invention is particularly adaptable for multi-blade tools where, due to inaccuracies that inevitably arise through manufacturing errors and tolerances, it has been difficult to construct a multi-blade tool with an accuracy comparable to that of a single blade tool. This difficulty is overcome in the present invention, and for this reason the construction is particularly useful for tools employing throwaway inserts because errors inherent in the indexing and replacing of such inserts can be readily compensated for.

The construction of the invention essentially comprises a tool holder in which one or more slots are formed parallel to the axis of rotation. A removable cartridge is supplied and mounted in each of the slots in such a way that it is rigidly positioned to resist cutting forces and yet may be adjusted longitudinally and radially of the axis of rotation. A further adjustment is provided so that all cartridges can be moved radially in unison.

Figure 4:
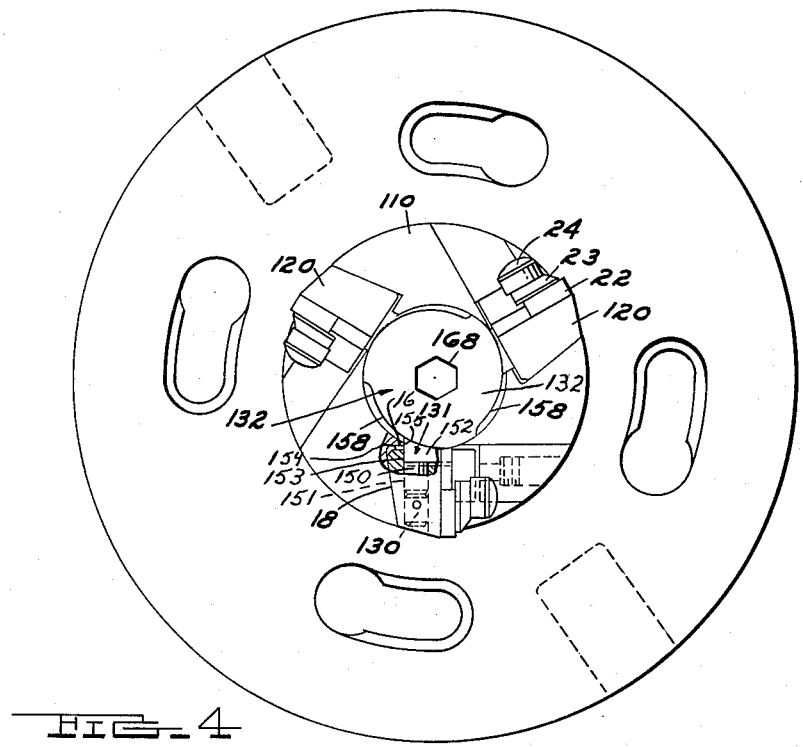

Other features and advantages of the invention may be better understood from the following description of the representative embodiments shown in the accompanying drawings which consist of the following views:

FIGURE 1, a side elevation of a multi-blade cutting tool mounted in an adapter which is shown fragmentarily;

FIGURE 2, an end elevation of the structure shown in FIGURE 1;

FIGURE 3, an enlarged sectional detail taken on the line 3—3 of FIGURE 2;

FIGURE 4, an end elevation of another constructional example; and

Figure 5:
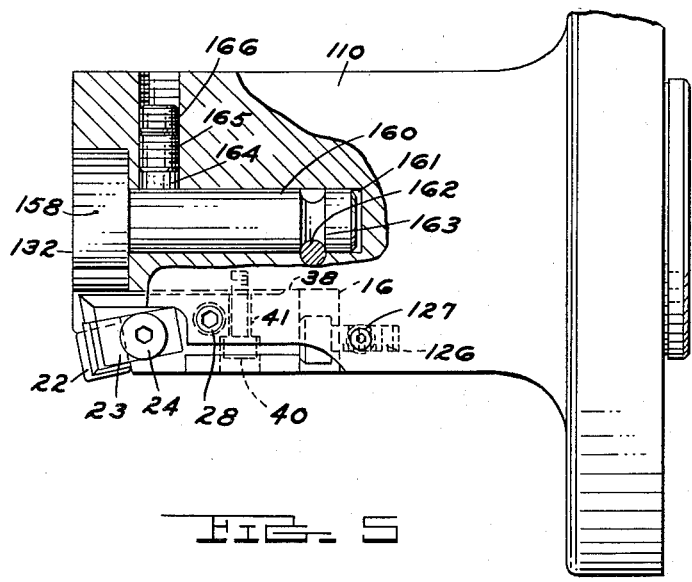

FIGURE 5, a side elevation of the tool shown in FIGURE 4.

Referring to FIGURES 1–3, the tool construction comprises a holder or body 10, which in the form illustrated has a tapered shank portion 11 for mounting the tool in a suitable adapter 12 or on the spindle of a machine in the conventional manner. The main portion of the holder 10 is cylindrical, and is provided with three slots 14. Each of these slots extends parallel to the axis 15 of the cylindrical portion and includes a bottom surface 16 which is tangent to a circle drawn on the axis as a center, and a pair of side walls 17 and 18 which extend outwardly from the surface 16 in converging relation to each other. Side wall 18, which faces in the direction of cutting rotation 13, extends the full length of the slot and at an acute angle to the slot bottom surface; side wall 17 is cut away adjacent the outer end of the tool body along a line 19, which in end elevation (FIG. 2), forms an extension of the bottom surface 16.

A cartridge 20 is provided for each of the slots 14, each cartridge being dimensioned to engage a slot with clearance between the slot and cartridge side walls and being formed with a suitable recess 21 shaped for mounting any desired form of cutting blade or insert 22 which is secured in the recess 21 in the conventional way by a clamp 23 and lock screw 24.

Each slot is provided with means for defining the position of the cartridge in a direction longitudinally of the slot, or in other words parallel to the rotational axis 15, and in the construction shown this means comprises an insert or plug 26 which is threaded into the tool body at the end of each slot to form an adjustable surface or stop against which each cartridge is positioned.

Each slot is also provided with means for securing the cartridge in the slot in engagement with the slot side wall 18 which faces in the direction 13 of cutting rotation, and consisting of a set screw 28 mounted in the tool holder body 10 and projecting through the slot side wall 17.

Each cartridge is provided with a radial adjusting screw 30 (FIGURE 3) which has a portion 31 projecting through the cartridge toward the bottom wall 16 of the slot. Each radial adjusting screw may merely engage the bottom wall 16 of a slot, but preferably means are provided for adjusting all cartridges radially in unison such as the cam 32 having a tapered periphery 33. The cam 32 is mounted on an adjusting screw 34 which is threaded into the holder in a suitable hole formed along the longitudinal center line thereof. The adjusting screw 34 includes a suitable drive means 36 so that it may be turned to move the tapered surface 33 longitudinally of the holder. Each adjusting screw portion 31 acts as a follower and extends into contact with the periphery 33 of the cam 32 as best shown in FIGURE 3.

This engagement between the adjusting screw portion 31 and the cam 32 forms one of two longitudinally spaced points of contact between each cartridge and the holder. The other of these points of contact is formed by a projection 38 at the inner end of each cartridge.

A clamping screw 40 extends through the cartridge at a location intermediate these two points of contact and into threaded engagement with the holder body. This screw 40 is mounted in an oversize counterbored hole 41 in the cartridge, as shown in FIGURE 1, to provide clearance for longitudinal movement of the cartridge. At a location intermediate the clamping screw 40 and the radial adjusting screw 30, each cartridge is partially severed by a saw cut 44 an amount sufficient to provide sufficient flexibility in the cartridge body for radial adjustment, at least in the amount of a few thousandths of an inch.

When the cartridges are first inserted in the holder slots, they are each aligned in a longitudinal direction by properly setting the adjustable stops 26 (with the cutting tool removed from the adapter) and are then clamped into position by tightening the screws 28 and 40. The radial locations of the cutting edge of the blade 22 of each cartridge are then brought into coincidence by mounting the holder on the machine, revolving the spindle and adjusting the radial screw 30 of each cartridge to obtain a cutting diameter which is concentric with the spindle axis. In the event any one of the cartridges requires very much radial adjustment, it may be necessary to also adjust the screw 40 of such cartridge, since this clamping screw should be set to firmly seat the cartridge projection 38 against the bottom surface 16 of the slot and firmly seat the adjusting screw portion 31 against the periphery of the cam 32, with some flexing of the cartridge resulting. The friction thus created between the cam and the radial adjusting screws 30 of all cartridges serves to lock the cam in its desired position.

The initial setting of the cam 32 is optional. If, for example, successive roughing and finishing cuts are to be taken, the cartridges will be installed with the cam 32 retracted toward its setting of smallest diameter. In most other instances the cam 32 would be set in a median position as shown so that the cam screw 34 can be rotated either way to increase or decrease the cutting diameter of all cartridges in unison.

When such a unison adjustment is made by rotating the cam 32, the cartridge lock screws 40 are normally not disturbed, since sufficient flexing of the cartridge will take place for an adjustment within the small range for which this construction is designed, and in this way the position of each cartridge is affected only by the operation of the cam.

When a cutting blade 22 has to be replaced or indexed to provide a new cutting edge, the relative positions of all cutting edges are then checked and any necessary adjustments are made to the cartridge or cartridges individually to obtain axial and radial alignment.

In the construction illustrated in FIGURES 4 and 5, which differs in but a few respects from the example of FIGURES 1–3, identical elements are identified by the same reference numbers. The cylindrical holder body 110 is provided with a plurality of slots 14 in each of which a cartridge 120 is positioned against the slot side wall 18 by a set screw 28, and is secured radially by a clamping screw 40.

Axial location of each cartridge 120 is defined by the adjustable abutment screw 126 which is held in the position desired by a set screw 127.

Radial location of the cutting blade 22 of each cartridge is defined by the engagement of a follower 131 which has a cylindrical portion 150 slidably extending into a bore 151 in the cartridge, and a shoe portion 152 which projects from a recess 153 in the cartridge bottom surface 154, through a notch 155 in the recess bottom surface 16, and into engagement with a lobe 158 of a cam 132. An adjusting screw 130 urges the follower 131 into engagement with the cam periphery and permits individual radial adjustment of each cartridge.

Cam 132 is formed with a shaft 160 which extends into a bore 161 formed on the longitudinal axis of the tool body 110. A pin 162 engages a circumferential slot 163 in the shaft to hold the cam and shaft in the bore for rotary but non-axial movement therein. Rotary movement of the cam 132 is selectively restrained by a friction disc 164, a set screw 165 and a lock screw 166. When these elements are loosened, the cam can be rotated by inserting a wrench in the drive socket 168.

Each cartridge 120 is inserted in its slot and positioned longitudinally and radially in a manner similar to that described for the construction of FIGURES 1–3. Each cartridge is formed with a projection 38 on its undersurface which engages the bottom wall 16 of the slot in which the cartridge is mounted, and the other point of contact between each cartridge and the holder is that provided by the engagement of the follower 131 with one of the lobes 158 of the cam 132. The cartridges are individually adjusted radially to place the cutting edges of their cutting blades 22 in concentric relation by operating the adjusting screw 130 and the clamping screw 40 of each cartridge as required. A change in the cutting diameter of the tool is obtained by moving all cartridges radially in unison through operation of the cam 132. Resetting of the cartridge clamping screws 40 will be necessary with this construction.

While preferred embodiments have been described above in detail, it will be understood that numerous modifications might be resorted to without departing from the scope of the invention as defined in the following claims.

We claim:

1. A cutting tool comprising a holder, a plurality of slots formed therein, each slot extending longitudinally inwardly from one end of said holder, in spaced relation around the circumference thereof and generally radially toward the longitudinal axis thereof; each of said slots having a bottom surface which is tangent to a circle drawn on said axis and a pair of side walls extending outwardly from said bottom surface in converging relation to each other; a plurality of cartridges each dimensioned to engage one of said slots with clearance between the side walls thereof and each having a cutting blade mounted thereon; means for adjustably defining the position of each cartridge individually in a direction longitudinally of its slot; means for securing each cartridge in its slot in engagement with the slot side wall which faces in the direction of cutting rotation of said holder; and means for adjustably positioning each cartridge individually in its slot in a direction radially of said axis.

2. A cutting tool according to claim 1 wherein said radial positioning means includes a reference surface on said holder, and means for individually positioning each cartridge radially relative to said reference surface.

3. A cutting tool according to claim 2 wherein said reference surface is formed on a cam movably carried by said holder.

4. A cutting tool comprising a holder, a plurality of slots formed therein, each slot extending longitudinally inwardly from one end of said holder, in spaced relation around the circumference thereof and generally radially toward the longitudinal axis thereof; each of said slots having a bottom surface which is tangent to a circle drawn on said axis and a pair of side walls extending outwardly from said bottom surface in converging relation to each other; a plurality of cartridges each dimensioned to engage one of said slots and each having a cutting blade mounted at one end thereof, means for adjusting each cartridge longitudinally of its slot whereby the cutting edges of the cutting blades of all cartridges can be positioned in a plane perpendicular to the axis of rotation of said holder, said clamping means being spaced longitridge in its slot in a direction radially of said axis whereby said cutting edges will rotate in a circle concentric with said axis; means for clamping each cartridge to said holder, said clamping means being spaced longitudinally of each cartridge from said radial positioning means, and each cartridge being constructed so as to flex intermediate said clamping means and said radial positioning means.

5. A cutting tool according to claim 4 wherein said radial positioning means includes a cam movably carried by the said holder and a follower element adjustably mounted on each of said cartridges, said follower element being urged into contact with said cam by said clamping means.

6. A cutting tool according to claim 5 further characterized by means for defining a point of contact between each cartridge and its slot which is spaced longitudinally of the cartridge from the point of contact between said follower element and said cam, said clamping means being located intermediate said points of contact.

7. A cutting tool comprising a holder, a plurality of slots formed therein, each slot extending longitudinally inwardly from one end of said holder, in spaced relation around the circumference thereof and generally radially toward the longitudinal axis thereof; each of said slots having a bottom surface which is tangent to a circle drawn on said axis and a pair of side walls extending outwardly from said bottom surface, one of said side walls facing generally in the direction of cutting rotation of said holder and extending at an acute angle to said bottom surface, a plurality of cartridges each dimensioned to engage one of said slots with clearance between the side walls thereof and each having a cutting blade mounted at one end thereof, means for individually adjusting each cartridge longitudinally of its slot whereby the cutting edges of the cutting blades of all cartridges can be positioned in a plane perpendicular to the axis of rotation of said holder; means for individually adjustably positioning each cartridge in its slot in a direction radially of said axis whereby said cutting edges will rotate in a circle concentric with said axis; and means for positioning each cartridge in its slot in engagement with the said one side wall thereof which faces in the direction of cutting rotation.

8. A cutting tool according to claim 1 further characterized by means for radially positioning said cartridges in unison.

9. A cutting tool according to claim 8 wherein the means for radially positioning said cartridges in unison includes a cam, means mounting said cam on said holder, and a follower element interposed between said cam and each of said cartridges.

10. A cutting tool according to claim 9 wherein each of said follower elements is adjustably carried by one of said cartridges to thereby provide the said means for radially positioning each cartridge individually in its slot.

11. A cutting tool comprising a holder, a slot formed therein, said slot extending generally longitudinally of said holder and generally radially toward the longitudinal axis thereof, said slot having one open end, an end wall, a bottom surface and a pair of side walls extending outwardly from said bottom surface in converging relation to each other, one of said side walls extending substantially normal to said bottom surface, the other of said side walls facing in the direction of cutting rotation and extending at an acute angle to said bottom surface, a cartridge dimensioned to engage said slot with clearance between side walls thereof, said cartridge having a cutting blade mounted adjacent one end thereof and an end wall at the other end thereof, means for adjustably positioning said cartridge in said slot in a direction radially of said axis; means for clamping each cartridge to said holder, said clamping means being spaced longitudinally of said cartridge from said radial positioning means, and said cartridge being constructed so as to flex intermediate said clamping means and said radial positioning means.

12. A cutting tool according to claim 1 wherein the means for securing each cartridge in said slot in engagement with the slot side wall which faces in the direction of cutting rotation comprises a clamping screw carried by said holder and movable into said slot through said one slot side wall and into clamping engagement with the portion of said cartridge adjacent thereto.

13. A cutting tool according to claim 1 wherein said means for adjustably positioning said cartridge in a radial direction includes an adjusting screw carried by said cartridge and a clamping screw extending through said cartridge and into threaded engagement with said holder at a location along said slot bottom surface spaced longitudinally of the cartridge from the location of said adjusting screw.

14. A cutting tool according to claim 1 further characterized by means for radially positioning said cartridges in unison including a cam mounted for adjusting rotation on said holder axis, said cam having a tapered peripheral surface concentric with said axis and movable longitudinally thereof in response to said adjusting rotation.

15. A cutting tool according to claim 14 wherein said means for individually positioning each cartridge in a direction radially of said tool holder axis includes an adjusting screw carried by each of said cartridges, and a follower element interposed between said adjusting screw and said cam.

16. A cutting tool comprising a holder, a slot formed therein, said slot extending generally longitudinally of said holder and generally radially toward the longitudinal axis thereof, said slot having one open end, and end wall, a bottom surface and a pair of side walls extending outwardly from said bottom surface in converging relation to each other, a cartridge dimensioned to engage said slot, said cartridge having a cutting blade mounted adjacent one end thereof and an end wall at the other end thereof, means for securing said cartridge in said slot in engagement with the slot side wall which faces in the direction of cutting rotation of said holder, means for adjustably defining the position of said cartridge in said slot in a direction longitudinally of said slot, means for adjustably positioning said cartridge in said slot in a direction radially of said axis of rotation, and said radial positioning means including a cam element carried by said holder.

References Cited in the file of this patent

UNITED STATES PATENTS

| | | |
|---|---|---|
| 1,184,722 | Cashman | May 30, 1916 |
| 2,605,655 | Kaiser | Aug. 5, 1952 |
| 2,623,422 | Billingsley | Dec. 30, 1952 |
| 2,821,098 | Blickenstorfer | Jan. 28, 1958 |

UNITED STATES PATENT OFFICE

CERTIFICATE OF CORRECTION

Patent No. 2,998,737 September 5, 1961

William Yogus et al.

It is hereby certified that error appears in the above numbered patent requiring correction and that the said Letters Patent should read as corrected below.

Column 4, line 31, strike out "said clamping means being spaced longi-" and insert instead -- means for adjustably positioning each car- --.

Signed and sealed this 6th day of February 1962.

(SEAL)
Attest:

ERNEST W. SWIDER
Attesting Officer

DAVID L. LADD
Commissioner of Patents